United States Patent
Goldberg et al.

(10) Patent No.: US 11,861,899 B2
(45) Date of Patent: Jan. 2, 2024

(54) SYSTEMS AND METHODS FOR AUGMENTED REALITY USING WEB BROWSERS

(71) Applicant: Geenee GmbH, Berlin (DE)

(72) Inventors: Alexander Goldberg, Los Angeles, CA (US); Davide Mameli, Berlin (DE); Matthias Emanuel Thömmes, Berlin (DE); Andrii Tkachuk, Berlin (DE)

(73) Assignee: Geenee GmbH, Berlin (DE)

(*) Notice: Subject to any disclaimer, the term of this patent is extended or adjusted under 35 U.S.C. 154(b) by 277 days.

(21) Appl. No.: 17/309,377

(22) PCT Filed: Nov. 22, 2019

(86) PCT No.: PCT/US2019/062859
§ 371 (c)(1),
(2) Date: May 21, 2021

(87) PCT Pub. No.: WO2020/107021
PCT Pub. Date: May 28, 2020

(65) Prior Publication Data
US 2022/0019801 A1 Jan. 20, 2022

Related U.S. Application Data

(60) Provisional application No. 62/770,967, filed on Nov. 23, 2018.

(51) Int. Cl.
*G06V 20/20* (2022.01)
*G06T 11/00* (2006.01)

(52) U.S. Cl.
CPC .............. *G06V 20/20* (2022.01); *G06T 11/00* (2013.01)

(58) Field of Classification Search
CPC .................. G06V 20/20; G06T 11/00; G06T 2207/20084; G06T 7/74
See application file for complete search history.

(56) References Cited

U.S. PATENT DOCUMENTS

2010/0309226 A1* 12/2010 Quack ................... G06F 16/50
382/218
2011/0129118 A1 6/2011 Hagbi et al.
(Continued)

OTHER PUBLICATIONS

International Search Report and Written Opinion of the International Searching Authority received in International Application No. PCT/US2019/062859, dated Jan. 29, 2020 (11 pgs.).
(Continued)

*Primary Examiner* — Jitesh Patel
(74) *Attorney, Agent, or Firm* — Finnegan, Henderson, Farabow, Garrett & Dunner, LLP

(57) ABSTRACT

Systems and methods for displaying augmented reality content relative to an identified object are disclosed. The systems and methods can include a set of operations. An operation can include providing a first image. An operation can include determining interest points in the first image. An operation can include identifying an object in the first image. An operation can include identifying augmented reality content associated with the object. An operation can include determining a first transformation for displaying the augmented reality content in the first image relative to the identified object. An operation can include providing the interest points and the first transformation. An operation can include determining a second transformation for displaying the augmented reality content in a second image relative to the identified object using, at least in part, the first transformation and the interest points. An operation can include displaying, by a user device, the augmented reality content.

15 Claims, 5 Drawing Sheets

(56) References Cited

U.S. PATENT DOCUMENTS

| | | | |
|---|---|---|---|
| 2011/0216090 A1* | 9/2011 | Woo | G06T 19/006 |
| | | | 382/103 |
| 2013/0121531 A1 | 5/2013 | Lefevre et al. | |
| 2013/0194305 A1* | 8/2013 | Kakuta | G06T 11/60 |
| | | | 345/633 |
| 2013/0326364 A1 | 12/2013 | Latta et al. | |
| 2014/0218291 A1* | 8/2014 | Kirk | G06T 7/70 |
| | | | 345/158 |
| 2015/0040074 A1* | 2/2015 | Hofmann | G06T 19/006 |
| | | | 715/852 |
| 2015/0206353 A1 | 7/2015 | Grasso et al. | |
| 2015/0228123 A1 | 8/2015 | Yasutake | |
| 2015/0310665 A1 | 10/2015 | Michail et al. | |
| 2016/0267720 A1* | 9/2016 | Mandella | G06F 3/03545 |
| 2017/0148186 A1 | 5/2017 | Holzer et al. | |
| 2017/0309079 A1 | 10/2017 | Naples et al. | |

OTHER PUBLICATIONS

Extended European Search Report received in EP Application No. 19887794, dated May 11, 2022 (8 pgs.).

* cited by examiner

SYSTEMS AND METHODS FOR AUGMENTED REALITY USING WEB BROWSERS

RELATED APPLICATIONS

This application is a U.S. National Stage Entry of International Application No. PCT/US2019/062859, filed Nov. 22, 2019, which designates the U.S. and claims the benefit of priority of U.S. Provisional Patent Application No. 62/770,967, filed Nov. 23, 2018, the contents of which are incorporated by reference in their entireties.

TECHNICAL FIELD

The present disclosure relates to systems and methods for providing a real-time augmented reality (AR) experience using a web browser and an identification server.

BACKGROUND

Augmented reality content can be computer-generated content overlaid on a real-world environment. Augmented reality has many applications with particular utility in the marketing and advertising industries. With augmented reality, companies can create unique experiences for customers. For example, customers can scan a catalog, billboard, screen, or other materials containing a company's products or product literature, and additional 3D content related to the scanned material can be displayed to the customer to provide an augmented reality experience.

SUMMARY

The disclosed systems and methods concern the displaying of augmented reality content relative to an object in a current image. The device can use a platform-independent browser environment to provide images to a remote server and to receive the AR content from the remote server. The device and a remote server can then determine the correct pose for the AR content to be displayed on the device.

The disclosed embodiments include a first method. The first method can include a series of operations. A first operation can include providing, by a user device to an identification server, a first image. A second operation can include determining, by the identification server, interest points in the first image. A third operation can include identifying, by the identification server, an object in the first image. A fourth operation can include identifying, by the identification server, augmented reality content associated with the object. A fifth operation can include determining, by the identification server, a first transformation for displaying the augmented reality content in the first image relative to the identified object. A sixth operation can include providing, by the identification server to the user device, the interest points and the first transformation. A seventh operation can include determining, by the user device, a second transformation for displaying the augmented reality content in a second image relative to the identified object using, at least in part, the first transformation and the interest points. An eight operation can include displaying, by the user device, the augmented reality content in the second image relative to the identified object using the second transformation.

In some embodiments, a pose of the augmented reality content can be specified with respect to a planar surface of the object. The first transformation can convert the pose to a perspective of the first image. Determining the first transformation can include determining a Euclidean or projective homography from a reference perspective of the object to a perspective of the first image. Determining the second transformation can include determining a third transformation from a perspective of the first image to a perspective of the second image.

In various embodiments, the third transformation can be a Euclidean or projective homography. The third transformation can be determined using, at least in part, data acquired by one or more inertial measurement units of the user device. The third transformation can be determined at least in part by matching interest points in the second image to a subset of the interest points in the first image. The interest points in the second image can be matched to the subset of the interest points in the first image using a motion detection algorithm.

The disclosed embodiments further include a second method. The second method can include a series of operations. A first operation can include receiving an image from a user device. A second operation can include identifying an object in the image. A third operation can include identifying augmented reality content for display relative to the identified object, a pose of the augmented reality content specified in a first coordinate system. A fourth operation can include determining a first transformation from the first coordinate system to a perspective of the image using, at least in part, the image and a model of the identified object. A fifth operation can include providing, to the user device, the first transformation and the augmented reality content for display by the user device relative to the identified object.

In some embodiments, the model of the identified object can be specified with respect to a third coordinate system. Determining the first transformation can include determining: a second transformation from the first coordinate system to a reference perspective of the object; and a third transformation from the reference perspective of the object to the perspective of the image using, at least in part, the image and the model of the identified object. The first transformation can be a product of the second transformation and the third transformation. The first transformation can be a Euclidean or projective homography. The augmented reality content can be specified with respect to a planar surface of the object. The object can be a planar object.

The disclosed embodiments further include a third method. The third method can include a series of operations. A first operation can include acquiring, by a camera of a user device, a first image containing an object. A second operation can include providing, to an identification server, the first image. A third operation can include receiving, from the identification server in response to providing the first image: interest points in the first image; augmented reality content, a pose of the augmented reality content specified in a first coordinate system relative to the object; and/or a first transformation from the first coordinate system to a perspective of the first image. A fourth operation can include determining a second transformation from the first coordinate system to the perspective of a second image acquired by the camera using, at least in part, the second image, the first transformation, and the interest points in the first image. A fifth operation can include displaying, by a display of the user device, the augmented reality content in the second image in the pose relative to the object using the augmented reality content and the second transformation.

In various embodiments, determining the second transformation can include estimating a third transformation from the perspective of the first image to the perspective of the second image using, at least in part, the second image and the interest points in the first image. Estimating the third transformation can include matching interest points in the second image to a subset of the interest points in the first image. Estimating the third transformation can include acquiring orientation information from one or more inertial measurement units of the user device. The third transformation can be a Euclidean or projective homography. Determining the second transformation can include matching, for each of a set of previously acquired images, a subset of interest points in a previously acquired image with interest points in the second image.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Figure 1:
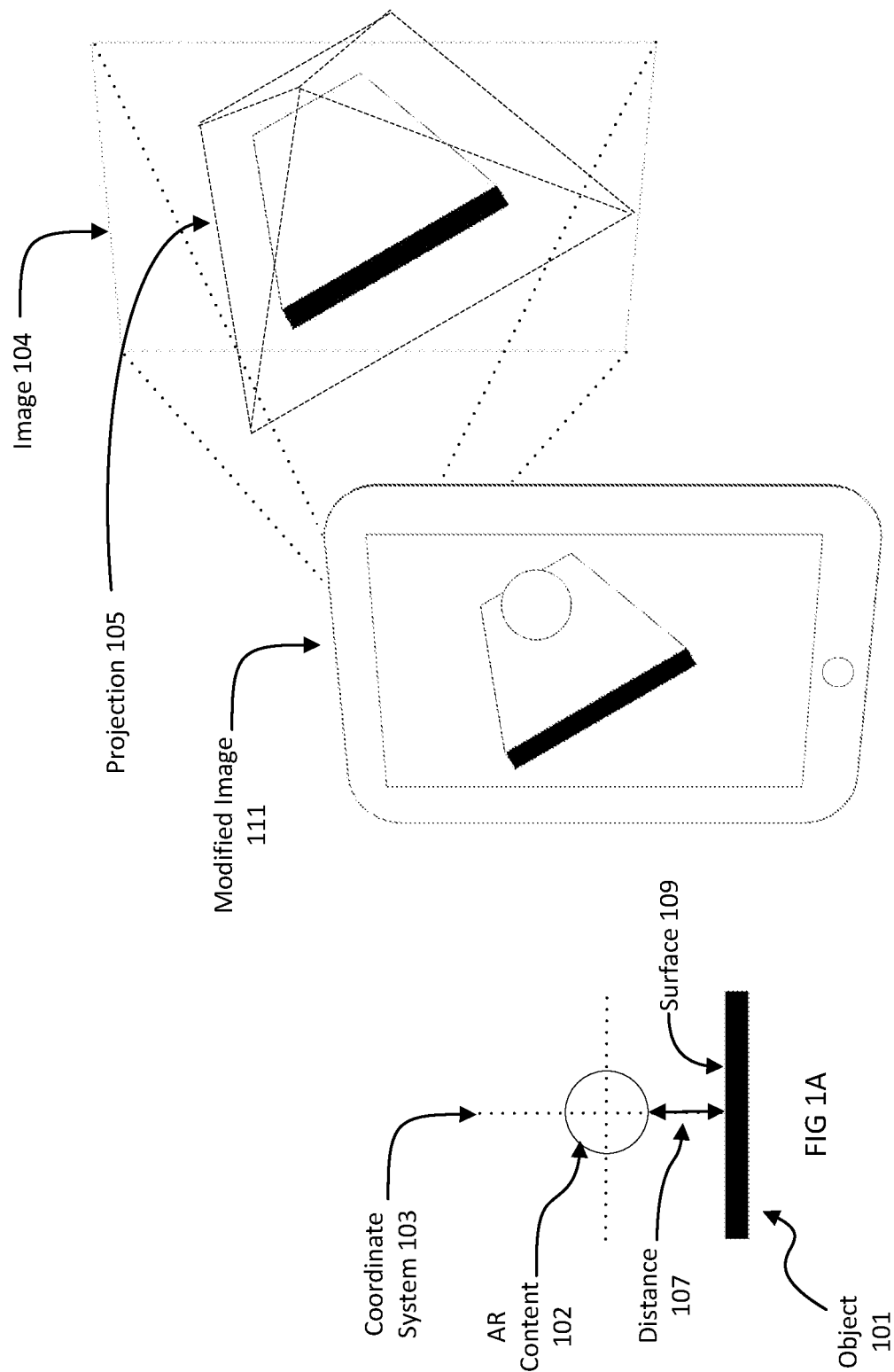
FIG. 1A depicts exemplary augmented reality content specified in a coordinate system, consistent with disclosed embodiments.
FIG. 1B depicts a computing device configured to display the augmented reality content of FIG. 1A relative to an object, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

The disclosed embodiments can enable the display of augmented reality content ("AR content") relative to an object in a current image. A client device and a remote server can interact to position the AR content in the current image. The remote server can perform computationally intensive operations, while the client device performs time-sensitive operations. The remote server can identify the object in a reference image, determine the position of the AR content relative to the object, and determine interest points in the reference image. The client device can then determine the placement of the AR content in a current image based, at least in part, on the reference image and interest points in the reference image. During typical operation, the client device may update the position of the AR content multiple times before the remote server generates another reference image. The device can use a platform-independent browser environment to provide images to the remote server and to receive the AR content from the remote server.

The disclosed embodiment provide multiple technical improvements over existing AR systems. AR content can be placed in a current image relative to an arbitrarily positioned object, rather than relative to a predetermined vertical or horizontal plane, improving the realism of the AR experience. Information about the identified object can be used to refine the positioning of AR content, improving accuracy. Computationally complex calculations can be offloaded to the remote server, speeding the delivery of AR content. Furthermore, the remote server can interact with the device as-needed, increasing the scalability of the overall AR content delivery system. The disclosed embodiments provide AR content using a platform-independent browser environment. Accordingly, the disclosed embodiments can provide AR content to more users than systems that rely on specific hardware or Application Programming Interfaces offered by particular device manufactures. Furthermore, the object can be used as a trigger for displaying the AR content, in place of express triggers such as QR codes or the like, which may appear artificial to users and therefore may diminish immersion in the AR experience.

FIG. 1A depicts a view of exemplary AR content 102 in a coordinate system 103, consistent with disclosed embodiments. In this non-limiting example, AR content 102 is a sphere, though more sophisticated AR content can be envisioned. The center of the sphere is depicted as being at the origin of coordinate system 103, though other relationships between AR content 102 and coordinate system 103 can be envisioned. Though depicted in FIG. 1A as a three-dimensional object, AR content 102 can also be a two-dimensional object, such as a label or banner. Coordinate system 103 can be express or implicit. As a non-limiting example, AR content 102 can be developed using a tool that allows objects to be placed in a virtual development environment. This virtual development environment can display coordinate axes showing the position and orientation of such objects. Alternatively, the virtual development environment can allow users to manipulate objects without expressly depicting coordinate axis.

A pose of AR content 102 can be specified with regards to object 101. The pose of AR content 102 can include the position and orientation of AR content 102. In some embodiments, AR content 102 and object 101 can both have positions and orientations specified with regards to coordinate system 103. For example, a center of AR content 102 can be at location [0, 0, 0] and a center of object 101 can be at location [a 0, −1, 0] in coordinate system 103. In various embodiments, a difference in position and orientation between AR content 102 and object 101 can be specified. For example, a center of AR content 102 can be specified as a distance above a center of object 101 or above a point in a plane containing object 101. In some embodiments, object 101 can be a planar object, such as a billboard, magazine or book page, box, painting, wall, playing card, counter, floor, or the like. In various embodiments, object 101 can be a non-planar object, such as a beer bottle, car, body part (e.g., a face or part of a face), or the like. As shown in FIG. 1A, augmented reality content 102 is displayed a distance 107 above an upper surface 109 of object 101.

FIG. 1B depicts a computing device 103 configured to display the AR content of FIG. 1A relative to object 101, consistent with disclosed embodiments. In some embodiments, computing device 103 can include a camera or be communicatively connected to a camera device (e.g., a webcam, digital video camera, action camera, or the like). For example, computing device 103 can include a camera capable of acquiring single images, sequences of images, or videos. As an additional example, computing device 103 can be configured to communicate with a webcam using a wired (e.g., USB or the like) or wireless (e.g., WIFI, Bluetooth, or the like) connection. In various embodiments, computing device 103 can include a display or be communicatively connected to a display device. For example, computing device 103 can have a built-in display or can be configured to communicate with a display device (e.g., a television, computer monitor, a remote computing device having a built-in monitor, or the like) using a wired (e.g., HMDI, DVI, Ethernet, or the like) or wireless (e.g., WIFI, Bluetooth, or the like) connection. In some embodiments, computing device 103 can be a mobile device, such as a wearable device (e.g., a smartwatch, headset, or the like), smartphone, tablet, laptop, digital video camera, action camera, or the like.

Computing device 103 can be configured to acquire an image 104 of object 101, consistent with disclosed embodiments. Computing device 103 can be configured to acquire image 104 using the camera of computing device 103 or a camera communicatively connected to computing device 103. Image 104 can have a perspective, a representation of the three-dimension world as projected onto a plane of the two-dimensional image 104. In some embodiments, image 104 can be acquired as a single image. In various embodiments, image 104 can be obtained from a stream of video data. Image 104 can include a projection of object 101 into the two-dimensional image 104. Consistent with disclosed embodiments, computing device 103 can be configured to identify object 101 in image 104.

Computing device 103 can be configured to determine a correct placement of AR content 102 in image 104. Determining the correct placement of AR content 102 in image 104 can include determining an overall transformation from a pose of AR content 102 in coordinate system 103 to a pose of AR content 102 in image 104. Consistent with disclosed embodiments, this overall transformation can be divided into two or more component transformations. The overall transformation can be a function of the two or more component transformations. For example, the overall transformation can be a product of the two or more component transformations.

The two or more component transformations can include a transformation from the pose of AR content 102 into a projection 105, consistent with disclosed embodiments. Projection 105 can be a perspective view of object 101, an isometric view of object 101, or the like. As shown in FIG. 1B, projection 105 can be a perspective top-down view onto the upper surface 109 of object 101. The transformation can determine the position and orientation of AR content 102 in projection 105. As projection 105 is a top-down perspective view, AR content 102 would appear over upper surface 109 of object 101 in projection 105. If projection 105 were a side view of object 101, AR content 102 would appear beside upper surface 109 (e.g., as in FIG. 1A).

The two or more component transformations can further include a transformation from projection 105 to a perspective of a reference image (not shown in FIG. 1B). The reference image may have been acquired as a single image, or may have been obtained from a video stream. In some embodiments, the reference image may be obtained by the camera of computing device 103, or the camera communicatively connected to computing device 103. In various embodiments, the reference image may have been obtained by another camera. In some embodiments, the transformation can be a homography (e.g., a Euclidean or projective homography).

The two or more component transformations can further include a transformation from the perspective of the reference image to the perspective of image 104. In some embodiments, the transformation can be a homography (e.g., a Euclidean or projective homography). In some embodiments, this transformation can be determined by matching interest points in the reference image with points in image 104. Such matching can be performed using a motion detection algorithm. These interest points may be, but need not be, points associated with object 101. For example, the interest points can include points in the foreground or background of image 104, apart from object 101, such as the corners of other objects in the image.

In some embodiments, AR content 102 can be placed into image 104 to create modified image 111. In some embodiments, the overall transformation can be applied to the coordinates of AR content 102 to determine a location of these coordinates in the perspective of image 104. In this manner, AR content 102 can be mapped to the perspective of image 104. After such mapping, in some embodiments, additional operations can be performed to ensure that AR content 102 is correctly rendered in modified image 111. For example, device 103 can be configured to determine which surfaces of AR content 102 are visible from the perspective of image 104 (e.g., some surfaces of AR content 102 may be obscured by other surfaces of AR content 102, or by surfaces of other objects displayed in image 104).

Figure 2:
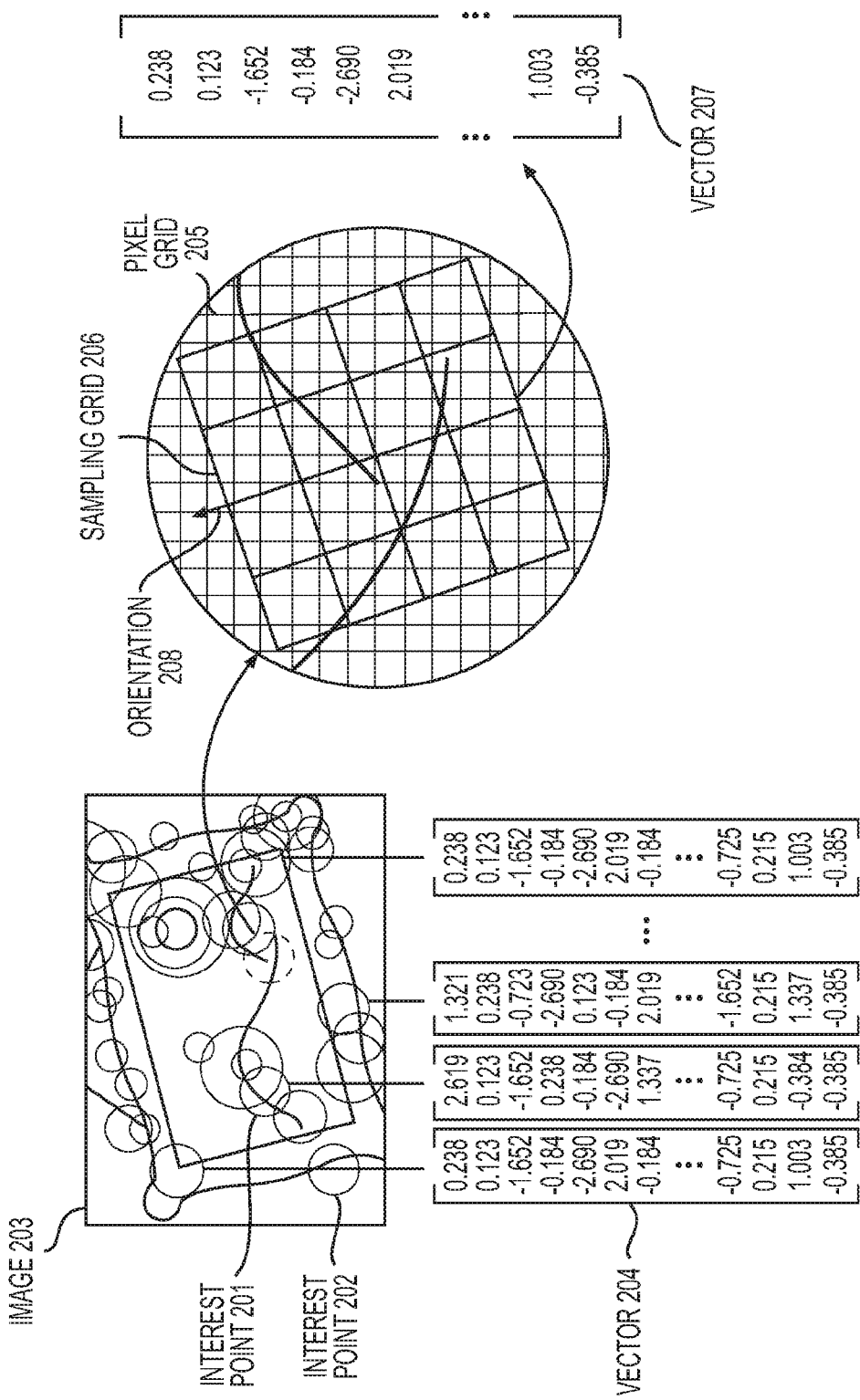
FIG. 2 depicts an exemplary method for determining interest points in an image, consistent with disclosed embodiments.

FIG. 2 depicts an exemplary method for determining interest points (e.g., interest points 201 and 202) in an image (e.g., image 203), consistent with disclosed embodiments. Interest points can be points that have a well-defined position in the image and can be detected in multiple similar image of the same environment, under differing conditions (e.g., lighting, focal planes, or the like) and from differing perspectives. For example, corners of objects, line endings, points of maximal curvature, isolated points of local intensity maxima or minima can serve as points or interest. Interest points in an image can be detected using an interest point detection algorithm, such as Features from Accelerated Segment Test (FAST), Harris, Maximally stable extremal regions (MSER), or the like. In some embodiments, each interest point can be associated with a pixel patch in the image. For example, when the interest points are detected using FAST, each interest point may be associated with a circle of pixels. The FAST algorithm may have analyzed these pixels to determine whether the pixel in the center of the circle can be classified as a corner. As an additional example, when the MSER algorithm is used to identify a connected component, the pixel patch can be the blob of pixels making up the connected component As would be appreciated by those of skill in the art, the envisioned embodiments are not limited to any particular method of identifying interest points in the image.

In some embodiments, an interest point can be represented by a feature descriptor vector (e.g., vector 204, vector 207). Scale-invariant feature transform (SIFT), Speeded Up Robust Features (SURF), Binary Robust Invariant Scalable Keypoint (BRISK), Fast Retina Keypoint (FREAK), are examples of known methods for generating feature descriptor vectors. Feature descriptor vectors can be a fixed-size vector of floating point numbers or bits that characterize the pixel patch (e.g., a 64-dimensional or 128-dimensional floating point vector, or a 512-dimension bit vector.) The vector can be generated by sampling the pixel patches, arranged within the image according to pixel grid 205, within a descriptor sampling grid 206 having an orientation 208, and the vector values can be chosen such that a distance between two vectors representing two pixel patches correlates with a degree of similarity (e.g., in luminance/brightness) between the two pixel patches.

Figure 3:
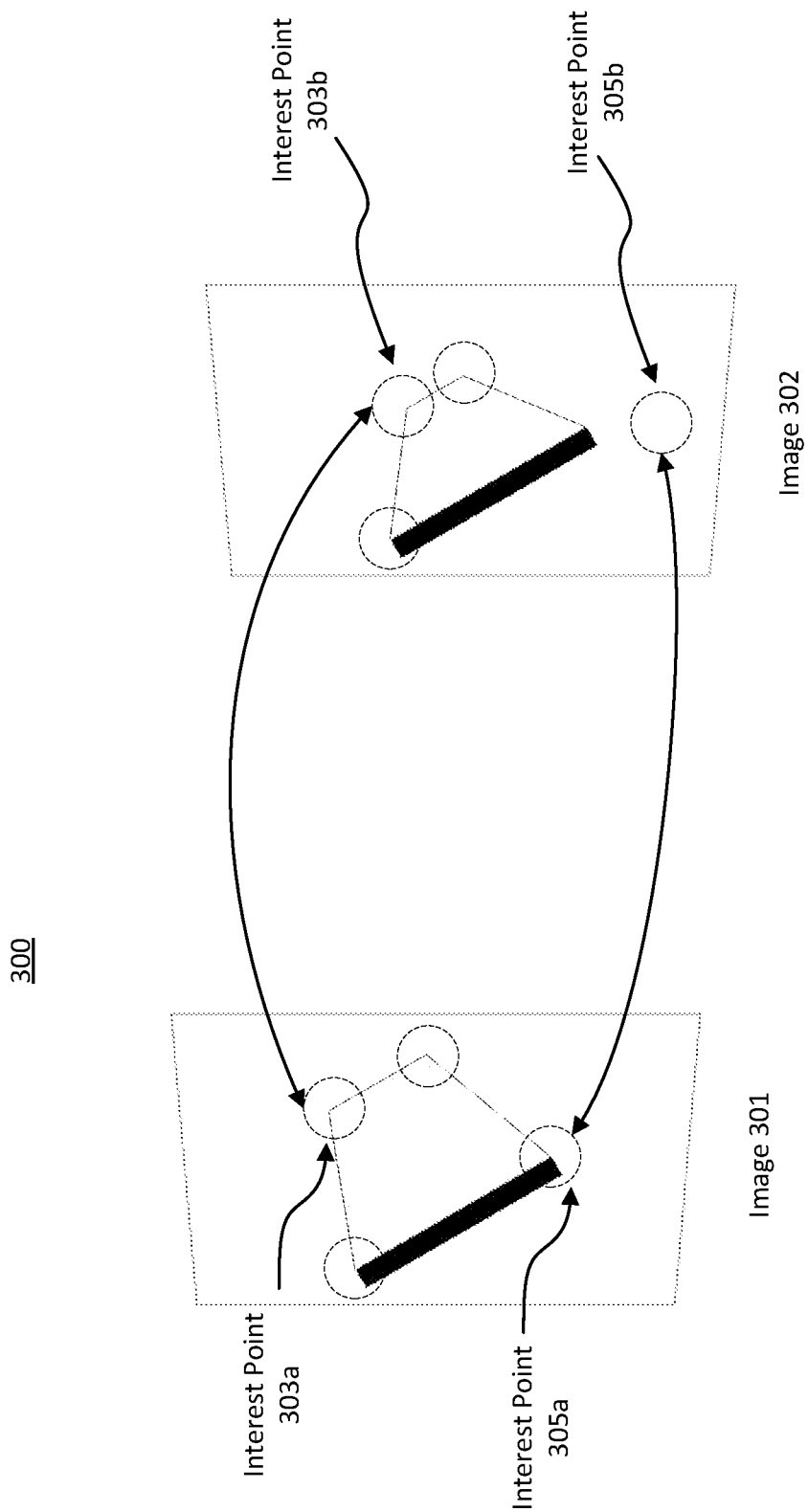
FIG. 3 depicts an exemplary method for matching points of interest between two images, consistent with disclosed embodiments.

FIG. 3 depicts an exemplary method 300 for computing a transformation in perspective between image 302 and one or more other images (e.g., image 301). In some embodiments, the two or more images can be acquired by the same camera. For example, method 300 can include comparing two or more images captured by a user device at different times, or two or more images captured by different camera, or any combination thereof.

Method 300 can include determining points of interest (e.g., interest points 303a and 305a) in a selected one of the two or more images (e.g., image 301). In some embodiments, the selected image can be a reference image. For example, the selected image can be the first image obtained in a sequence of images and the remaining images can be obtained later. The interest points can be identified as described above with regards to FIG. 2.

Method 300 can include matching at least some of the points in the reference image to corresponding points in image 302. For example, as shown in FIG. 3, interest point 303a can match with interest point 303b. Likewise, interest point 305a can match with interest point 305b. In some embodiments, matching can be performed between the pixel patches. For example, a motion detection algorithm (e.g., Extracted Points Motion Detection, or the like) can be used to detect a pixel patch in image 302 that matches a pixel patch associated with an interest point in the reference image. In various embodiments, matching can be performed between feature descriptors determined from pixel patches. For example, feature descriptors can be determined for an interest point in the reference image and for pixel patches in image 302. The feature descriptor for the interest point in the reference image can be compared to the feature descriptors for the pixel patches in image 302 to determine a match. In some embodiments, the match can be the best match according to a metric dependent on the similarity of the feature descriptors. In various embodiments, a match can be sought for at least some, or all, interest points in the reference image. However, a match may not be identified for all interest points for which a match is sought. For example, changes in the position of the camera between image 302 and the reference image may cause a point of interest in the reference image to move outside of image 302. As an additional example, changes in the environment may obscure or alter an interest point in the reference image (e.g., a person walking in front of a prior point of interest).

Method 300 can include determining whether pairs of matching interest points can be used to generate a transformation between the reference image and image 302, consistent with disclosed embodiments. This determination can depend on the relative positions of the interest points in the images (e.g., the position of the interest point in the reference image and the position of the matching point in image 302). In some embodiments, when the relative position of the interest points in the images satisfies a distance criterion, the matching points are not used to generate the transformation. The distance criterion can be a threshold. For example, when a difference between a location of an interest point in the reference image and a location of the interest point in image 302 exceeds a distance threshold, the interest point and matching point may not be used to generate the transformation. Such points may be discarded to avoid poor matches. For example, an interest point in the reference image may erroneously match to a point in image 302. Such an erroneous match may be far from the original location of the interest point in the reference image. Accordingly, discarding matches that are greater than a threshold distance can avoid using such erroneous matches in determining the transformation. For example, as shown in FIG. 3, interest point 305a can erroneously match to point 305b. Including these erroneously matching points in the determination of the transformation from image 301 to image 302 could decrease the accuracy of the transformation.

Method 300 can include determining a transformation between the reference image (e.g., image 301) and image 302. In some embodiments, the transformation can be determined by estimating a projective homography matrix between the reference image and image 302. Methods for estimate such a matrix are described, as a non-limiting example, in "Pose estimation for augmented reality: a hands-on survey" by Marchand, Eric, Hideaki Uchiyama, and Fabien Spindler, and incorporated herein by reference. In some embodiments, the projective homography matrix can encode information about changes in position and orientation between the reference image and image 302.

In some embodiments, the computing device can have inertial measurement sensors. Inertial measurement data can be used in combination with the image data to estimate changes in position and orientation of the camera between the acquisition of the reference image and the acquisition of image 302. These estimate changes in position and orientation can be used in determining the transformation from the reference image to image 302, according to known methods.

In various embodiments, image 302 can be compared to multiple previous reference images. Interest points in these multiple reference images can be matched to points in image 302. These matching points can be used to estimate changes in position and orientation between the reference images and image 302, enabling a more precise determination of the current position and orientation of the camera.

Figure 4:
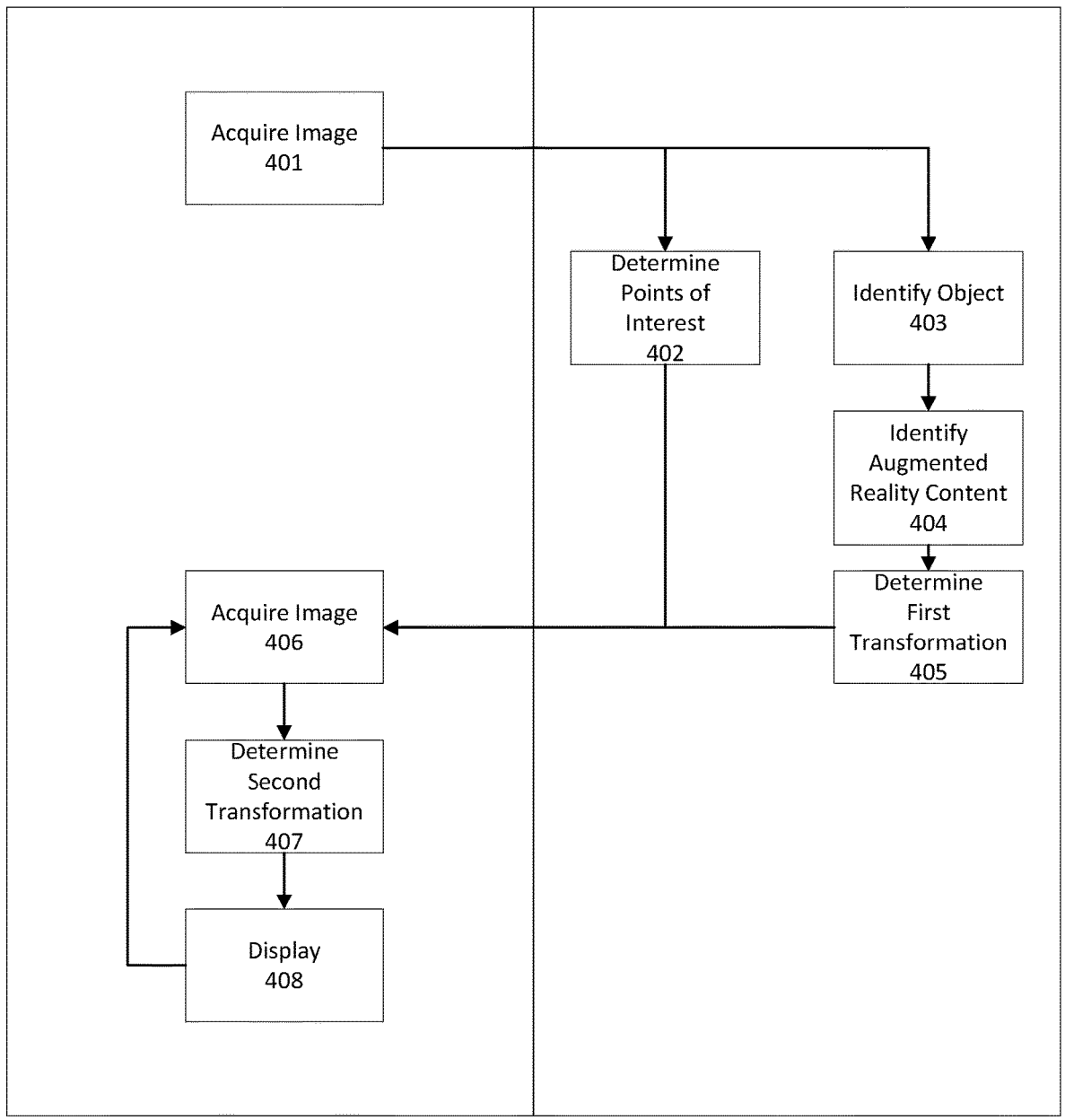
FIG. 4 depicts an exemplary method for displaying augmented reality content relative to an object, consistent with disclosed embodiments.

FIG. 4 depicts an exemplary method 400 for displaying AR content on a device relative to an object, consistent with disclosed embodiments. Method 400 can be performed by a computing device 420 and a server 430. In some embodiments, method 400 can be performed using a platform-independent browser environment. As described herein, method 400 can include steps of capturing an image, determine points of interests in the image, identifying an object in the image, and determining a transformation from a coordinate system of the AR content to current perspective of a camera associated with the computing device.

In step 301, the computing device (e.g., computing device 103) can capture an image (e.g., image 104). The device can be a smartphone, tablet, or a similar device with image capture functionality. The image can be a picture, a frame of a video feed, or another like representation of an object of interest (e.g., object 101). The image may also be of an entire area of view, or it may be only a certain portion of the area of view. In some embodiments, a web application running on the computing device can be configured to initialize a camera feed. The camera feed can be configured to acquire images from a camera associated with the computing device. In various embodiments, the computing device can also be configured to acquire device position and orientation information using the DeviceMotion API, or a similar application.

After acquiring the image, the device can transfer the image to an identification server. In some embodiments, the device can be configured to use WebRTC, or a similar application, to communicate with the identification server. The transfer can take place via, for example, a wireless link, a local area network (LAN), or another method for sending electromagnetic or optical signals that carry digital data streams representing various types of information. In some embodiments, the identification server can be an image reference database, a feature index database, or a web-based server that provides an image recognition service. It is to be understood that the identification server could be one server or a collection of servers.

In step 402, the identification server, after receiving the image, can determine interest points of interest (e.g., interest points 303a and 305a) in the image, as describe above with regards to FIG. 2. The identification server can then transfer the points of interest to the device. In some embodiments, the identification server can transfer the points of interest to the device using the wireless link, a local area network (LAN), or another method used by the device to transfer the image to the identification server.

In step 403, the identification server can identify the object in the image (e.g., reference object 101). The object can be a thing of interest, such as a billboard, an item of clothing, or a scene that the user would like to learn more information about. The object can be multidimensional or planar. In some embodiments, the identification server can identify the object by using an object recognition algorithms and pattern matching algorithm. For example, the identification server can use methods such the Viola-Jones method, for example, as described in "The Rapid Object Detection Using a Boosted Cascade of Simple Features," by Paul Viola and Michael Jones, performs a cascade of predefined scan operations in order to assess the probability of the presence of a certain shape in the image, and a classification algorithm to identify the object. As an additional example, the identification server can use one or more machine learning methods, such as convolutional neural networks, decision trees, or the like to identify and localize the object within the image. Such machine learning methods may have, a training phase and a test phase, during which the training data may be used to identify objects. Such methods are computationally intensive and may rely on the careful pre-selection of training images. As a further example, the identification server can use attributes or features displayed by the object for image-based detection and recognition. In such embodiments, characteristics can be extracted from a set of training images of the object, and then the system can detect whether there are corresponding characteristics among either a set of snapshots, or between a snapshot and a training set of images. As can be appreciated from the foregoing, the disclosed embodiments are not limited to a particular manner of identifying the image in the image.

In some embodiments, a model of the object can be available to the identification server. The model can be a matching representation of the object, and it can be specified with respect to a specific coordinate system. The model can be multidimensional or planar. For example, the model of a billboard could be a 3D representation of the billboard defined from the point-of-view facing the front of the billboard.

In step 404, when the identified object matches a model of the object that is available to the identification server, the identification server can identify AR content (e.g., augmented reality content 102) that corresponds to the model of the object. The AR content can be computer-generated content to be overlaid on a real-world environment, and which can be specified with respect to a specific coordinate system. For example, the pose (or orientation) of the AR content could be specified with respect to a planar surface of the object. As an exemplary scenario, referencing FIG. 1A, an AR sphere could be defined a certain distance away from the center of a surface of a billboard.

In step 405, the identification server can determine a first transformation for displaying the AR content in the image relative to the identified object, which it can then relay to the device. The first transformation can represent a set of relationships between the locations of points within the AR content's coordinate system and the locations of the corresponding points within the image's coordinate system, such that the AR content's pose is correct when overlaid on the image. Continuing with the example above, referencing FIG. 1B, the identification server can determine a transformation such that the AR sphere is positioned correctly when a user device captures an image of the billboard. The first transformation can also be the product of a second transformation and a third transformation. The second transformation could represent, for example, a set of relationships between the locations of points within the AR content's coordinate system and the locations of the corresponding points within the object's coordinate system. Similarly, the third transformation could represent, for example, a set of relationships between the locations of points within the object's coordinate system and the locations of the corresponding points within the image's coordinate system. The first, second, and third transformations can be a Euclidean or projective homography, and they can each be determined using, at least in part, the image and a model of the identified object. The identification server can then transfer the first transformation to the device using, for example, the same method used by the device to transfer the image to the identification server.

In step 406, the device can capture a second image. The device can capture the second image in substantially the same manner as the (first) image as described above. For example, the second image can be captured at a later time using the same camera as the first image (though the reference object or the camera may have changed relative positions and orientations in the interim) In various embodiments, the device can capture the second image using a different camera.

In step 407, the device can determine a second transformation for displaying the AR content in the second image relative to the identified object. The second transformation can represent a set of relationships between the locations of points within the AR content's coordinate system and the locations of the corresponding points within the second image's coordinate system. The device can determine the second transformation by using, at least in part, the first transformation and/or the points of interest received by the device from the identification sever. The device can also determine the second transformation by estimating a third transformation from a perspective of the first image to a perspective of the second image. For example, the device could estimate the third transformation at least in part by matching interest points in the second image to a subset of the interest points in the first image. In an exemplary scenario, the device could estimate the third transformation using, at least in part, data acquired by one or more of the device's Inertial Measurement Units (IMU) and using positional data between the first and second image to make the estimation. In some embodiments, the second and the third transformation can be a Euclidean or projective homography. In cases where more than one image has been previously captured, the device can determine the second transformation by matching, for each one of a set of previously acquired images, a subset of interest points in the one of the previously acquired images with interest points in the second image.

In step 408, the device can display the augmented reality content in the second image in a pose relative to the object using, at least in part, the augmented reality content and/or the second transformation. The device can continue to capture subsequent images, can determine subsequent transformations, and can display the AR content in the correct pose relative to the object using the subsequent transformations until a disrupting event, such as loss of tracking, occurs. Tracking can be lost when, for example, the person who operates the device shifts the device's direction substantially, or the device captures a new object that had not been identified before. Once the system is again capable of tracking the thing of interest, the method can begin anew starting at step 301.

In some embodiments, the device can be configured to determine the second transformation on a background thread using a WebWorker API, or similar API. Meanwhile, in the main thread, the user interface (UI) and the AR overlays can be drawn while descriptor matching, motion detection calculation and all other calculations are taking place in background threads using WebWorkers. When using IMU data, the positional data can be calculated in the main thread using IMU sensor readings.

Figure 5:
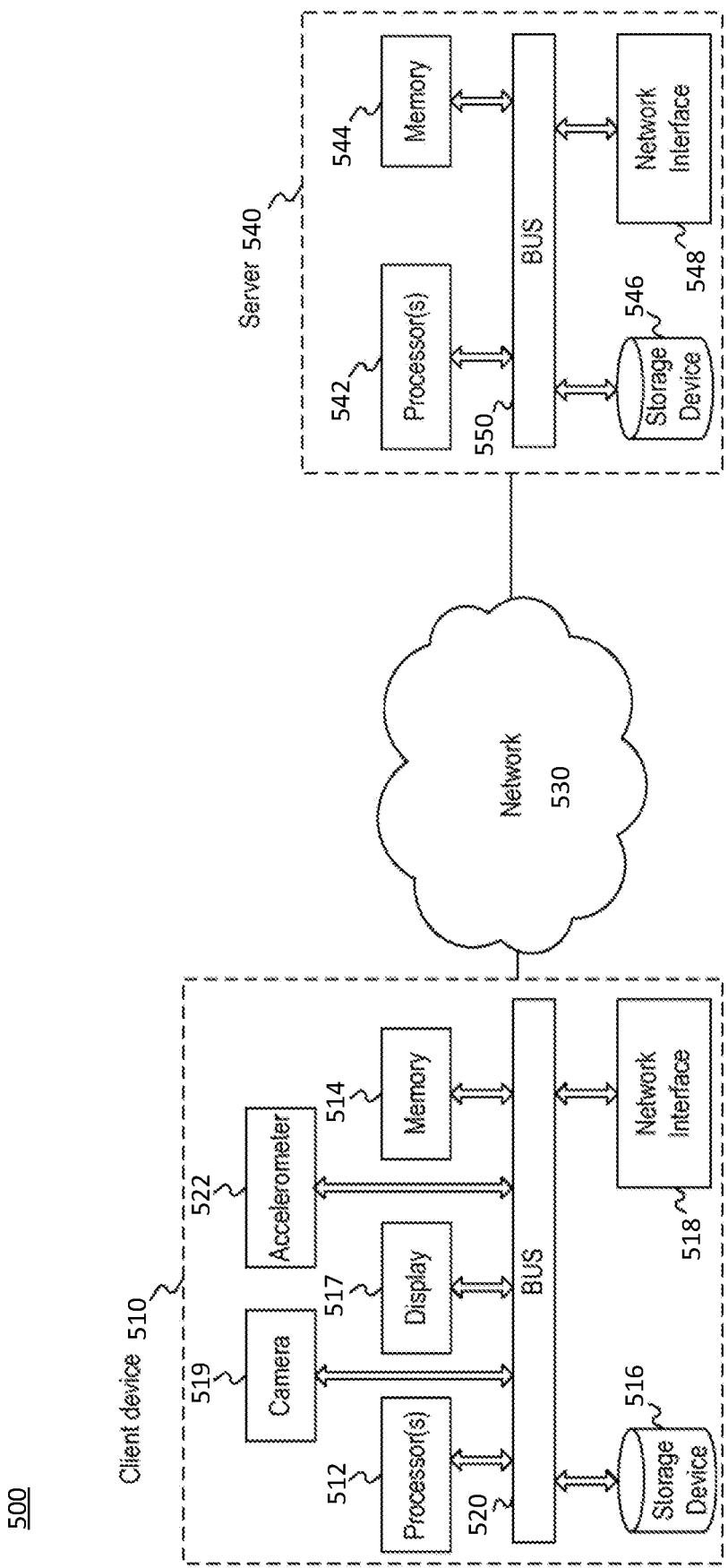
FIG. 5 depicts an exemplary system on which embodiments of the present disclosure can be implemented, consistent with disclosed embodiments.

FIG. 5 depicts an exemplary system 500 with which embodiments described herein can be implemented, consistent with embodiments of the present disclosure. System 500 can include a client device 510, a network 530, and a server 540. Client device 510 can include one or more processors 512, a memory device 514, a storage device 516, a display 517, a network interface 518, a camera 519 (or other image generation device), and an accelerometer 522 (or other orientation determination device), all of which can communicate with each other via a bus 520. In some embodiments, display 517 can preferably be a touchscreen. The I/O devices can include a microphone and any other devices that can acquire and/or output a signal. Through network 530, client device 510 can exchange data with a server 540. Server 540 can also include one or more processors 542, a memory device 544, a storage device 546, and a network interface 548, all of which can communicate with each other via a bus 550.

Both memories 514 and 544 can be a random access memory (RAM) or other volatile storage devices for storing information and instructions to be executed by, respectively, processors 512 and 542. Memories 514 and 544 can also be used for storing temporary variables or other intermediate information during execution of instructions to be executed by processors 512 and 542. Such instructions, after being stored in non-transitory storage media accessible to processors 512 and 514 (e.g., storage devices 516 and 546), can render computer systems 510 and 540 into special-purpose machines that are customized to perform the operations specified in the instructions. The instructions can be organized into different software modules, which can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, can refer to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein can be preferably implemented as software modules but can be represented in hardware or firmware. Generally, the modules described herein can refer to logical modules that can be combined with other modules or divided into sub-modules despite their physical organization or storage.

Client device 510 and server 540 can implement the techniques described herein using customized hard-wired logic, one or more ASICs or FPGAs, firmware and/or program logic which in combination with the computer system causes or programs client device 510 and server 540 to be a special-purpose machine. According to some embodiments, the operations, functionalities, and techniques and other features described herein can be performed by client device 540 and server 540 in response to processors 512 and 542 executing one or more sequences of one or more instructions contained in, respectively, memories 514 and 544. Such instructions can be read into memories 514 and 544 from another storage medium, such as storage devices 516 and 546. Execution of the sequences of instructions contained in memories 514 and 544 can cause respectively processors 512 and 542 to perform the process steps described herein. In alternative embodiments, hard-wired circuitry can be used in place of or in combination with software instructions.

The term "non-transitory media" as used herein can refer to any non-transitory media for storing data and/or instructions that cause a machine to operate in a specific fashion. Such non-transitory media can comprise non-volatile media and/or volatile media. Non-volatile media can include, for example, optical or magnetic devices, such as storage devices 516 and 546. Volatile media can include dynamic memory, such as memories 514 and 544. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Network interfaces 518 and 548 can provide a two-way data communication coupling to network 530. For example, network interfaces 518 and 548 can be an integrated services digital network (ISDN) card, cable modem, satellite modem, or a modem to provide a data communication connection to a corresponding type of telephone line. As another example, network interfaces 518 and 548 can be a local area network (LAN) card to provide a data communication connection to a compatible LAN. Wireless links can also be implemented. In any such implementation, network interfaces 518 and 548 can send and receive electrical, electromagnetic or optical signals that carry digital data streams representing various types of information, and which can provide the data stream to storage devices 516 and 546. Processors 512 and 542 can then convert the data into a different form (e.g., by executing software instructions to compress or decompress the data), and can then store the converted data into the storage devices (e.g., storage devices 516 and 546) and/or transmit the converted data via network interfaces 518 and 548 over network 530.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that can incorporate hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems can control and schedule computer processes for execution, perform memory management, provide file system, networking, I/O services, and provide a user interface functionality, such as a graphical user interface ("GUI"), among other things.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

Furthermore, as used herein the term "or" encompasses all possible combinations, unless specifically stated otherwise or infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C. Similarly, the use of a plural term does not necessarily denote a plurality and the indefinite articles "a" and "an" do not necessary denote a single item, unless specifically stated otherwise or infeasible.

It is intended, therefore, that the specification and examples be considered as example only, with a true scope and spirit being indicated by the following claims and their full scope of equivalents.

What is claimed is:

1. A method of displaying augmented reality content relative to an identified object, comprising:
   receiving an image from a user device;
   identifying an object in the image;
   identifying augmented reality content for display relative to the identified object, a pose of the augmented reality content specified in a first coordinate system;
   determining a first transformation from the first coordinate system to a perspective of the image using, at least in part, the image and a model of the identified object, wherein the model of the identified object is specified with respect to a third coordinate system and determining the first transformation comprises determining:
   a second transformation from the first coordinate system to a reference perspective of the object; and a third transformation from the reference perspective of the object to the perspective of the image using, at least in part, the image and the model of the identified object; and providing, to the user device, the first transformation and the augmented reality content for display by the user device relative to the identified object.

2. The method of claim 1, wherein:
the first transformation is a product of the second transformation and the third transformation.

3. The method of claim 1, wherein:
the first transformation is a Euclidean or projective homography.

4. The method of claim 1, wherein:
the augmented reality content is specified with respect to a planar surface of the object.

5. The method of claim 1, wherein:
the object is a planar object.

6. A method of displaying augmented reality content relative to an identified object, comprising:
acquiring, by a camera of a user device, a first image containing an object;
providing, to an identification server, the first image;
receiving, from the identification server in response to providing the first image:
interest points in the first image;
augmented reality content, a pose of the augmented reality content specified in a first coordinate system relative to the object;
a first transformation from the first coordinate system to a perspective of the first image;
determining a second transformation from the first coordinate system to the perspective of a second image acquired by the camera using, at least in part, the second image, the first transformation, and the interest points in the first image, wherein determining the second transformation comprises estimating a third transformation from the perspective of the first image to the perspective of the second image using, at least in part, the second image and the interest points in the first image; and
displaying, by a display of the user device, the augmented reality content in the second image in the pose relative to the object using the augmented reality content and the second transformation.

7. The method of claim 6, wherein:
estimating the third transformation comprises matching interest points in the second image to a subset of the interest points in the first image.

8. The method of claim 6, wherein:
estimating the third transformation comprises acquiring orientation information from one or more inertial measurement units of the user device.

9. The method of claim 6, wherein:
the third transformation is a Euclidean or projective homography.

10. The method of claim 6, wherein:
determining the second transformation further comprises matching, for each of a set of previously acquired images, a subset of interest points in a previously acquired image with interest points in the second image.

11. A non-transitory, computer-readable medium containing instructions that, when executed by at least one processor of a system including a camera and a display, causes the system to perform operations of displaying augmented reality content relative to an identified object, comprising:
acquiring, by the camera, a first image containing an object;
providing, to an identification server, the first image;
receiving, from the identification server in response to providing the first image:
interest points in the first image;
augmented reality content, a pose of the augmented reality content specified in a first coordinate system relative to the object;
a first transformation from the first coordinate system to a perspective of the first image;
determining a second transformation from the first coordinate system to the perspective of a second image acquired by the camera using, at least in part, the second image, the first transformation, and the interest points in the first image, wherein determining the second transformation comprises estimating a third transformation from the perspective of the first image to the perspective of the second image using, at least in part, the second image and the interest points in the first image; and
displaying, by the display, the augmented reality content in the second image in the pose relative to the object using the augmented reality content and the second transformation.

12. The non-transitory, computer-readable medium of claim 11, wherein:
estimating the third transformation comprises matching interest points in the second image to a subset of the interest points in the first image.

13. The non-transitory, computer-readable medium of claim 11, wherein:
estimating the third transformation comprises acquiring orientation information from one or more inertial measurement units.

14. The non-transitory, computer-readable medium of claim 11, wherein:
the third transformation is a Euclidean or projective homography.

15. The non-transitory, computer-readable medium of claim 11, wherein:
determining the second transformation further comprises matching, for each of a set of previously acquired images, a subset of interest points in a previously acquired image with interest points in the second image.

* * * * *